US008201523B2

(12) United States Patent
Cohen (10) Patent No.: US 8,201,523 B2
(45) Date of Patent: Jun. 19, 2012

(54) INTEGRATED COMBUSTION AND ELECTRIC HYBRID ENGINES AND METHODS OF MAKING AND USE THEREOF

(76) Inventor: Kenneth J. Cohen, Silver Spring, MD (US)

(*) Notice: Subject to any disclaimer, the term of this patent is extended or adjusted under 35 U.S.C. 154(b) by 326 days.

(21) Appl. No.: 12/493,579

(22) Filed: Jun. 29, 2009

(65) Prior Publication Data
US 2009/0322098 A1    Dec. 31, 2009

Related U.S. Application Data (60) Provisional application No. 61/129,462, filed on Jun. 27, 2008, provisional application No. 61/136,459, filed on Sep. 8, 2008.

(51) Int. Cl.
*F02B 63/00* (2006.01)
*F02B 63/04* (2006.01)
*H02K 33/00* (2006.01)
(52) U.S. Cl. ................ 123/2; 290/1 A; 310/15
(58) Field of Classification Search .......... 123/1 R, 123/2, 3, 46 E; 310/12, 15–24; 290/1 A
See application file for complete search history.

(56) References Cited

U.S. PATENT DOCUMENTS

| | | | | |
|---|---|---|---|---|
| 2,060,263 A * | 11/1936 | Sweeney | .......... | 123/1 R |
| 3,206,609 A * | 9/1965 | Dawes | .......... | 310/23 |
| 3,234,395 A * | 2/1966 | Colgate | .......... | 123/46 E |
| 3,694,679 A | 9/1972 | Erdoesy | | |
| 4,213,428 A * | 7/1980 | Bradley | .......... | 123/1 R |
| 4,392,457 A * | 7/1983 | Martin | .......... | 123/1 R |
| 4,631,455 A | 12/1986 | Taishoff | | |
| 4,631,456 A | 12/1986 | Drescher et al. | | |
| 5,691,588 A | 11/1997 | Lutz et al. | | |
| 6,049,146 A * | 4/2000 | Takara | .......... | 310/24 |
| 6,199,519 B1 * | 3/2001 | Van Blarigan | .......... | 123/46 R |
| 6,397,793 B2 * | 6/2002 | Yang et al. | .......... | 123/46 E |
| 6,748,907 B2 * | 6/2004 | Malmquist et al. | .......... | 123/46 E |
| 6,932,030 B2 * | 8/2005 | Perlo et al. | .......... | 123/46 E |
| 7,076,950 B2 * | 7/2006 | Klostermann | .......... | 60/513 |
| 7,318,506 B1 * | 1/2008 | Meic | .......... | 123/46 R |
| 7,426,910 B2 * | 9/2008 | Elwart | .......... | 123/46 E |
| 7,629,713 B2 * | 12/2009 | Beaulieu | .......... | 123/1 A |
| 7,640,910 B2 * | 1/2010 | Lemke et al. | .......... | 123/197.4 |
| 7,777,357 B2 * | 8/2010 | Hyde et al. | .......... | 123/46 E |

FOREIGN PATENT DOCUMENTS

| | | | |
|---|---|---|---|
| CN | 1978877 A | * | 6/2007 |
| DE | 19813992 A1 | * | 10/1999 |
| WO | WO 9533921 A1 | * | 12/1995 |
| WO | WO 2008028216 A1 | * | 3/2008 |

* cited by examiner

*Primary Examiner* — Noah Kamen
(74) *Attorney, Agent, or Firm* — Arent Fox, LLP (57) ABSTRACT

A new approach to achieving greater fuel efficiencies in the design and implementation of hybrid automotive vehicles. Efficiency and power benefits accrue from the integration of electric motor components into various components of combustion-fueled engines, thus obviating the need for much separate equipment, such as discrete electric motor(s) and gear arrangements in order to obtain hybrid operation. Among other things, a significant savings of weight in the vehicle and increased control of the coordination between combustion-fueled and electric motor propulsion of the vehicle is obtained.

8 Claims, 4 Drawing Sheets

INTEGRATED COMBUSTION AND ELECTRIC HYBRID ENGINES AND METHODS OF MAKING AND USE THEREOF

This application claims priority to applicant's U.S. Provisional Patent Application No. 61/129,462 titled "INTEGRATED ELECTRICAL AND INTERNAL COMBUSTION ENGINE" filed Jun. 27, 2008 and U.S. Provisional Patent Application No. 61/136,459 titled "INTEGRATED WANKEL ROTARY FUEL AND ELECTRIC-POWERED AUTOMOBILE ENGINE FOR USE IN A HYBRID VEHICLE" filed Sep. 8, 2008, the entirety of each of which is hereby incorporated by reference herein.

BACKGROUND OF THE INVENTION

1. Field of the Invention

Aspects of the present invention relate to the integration of a fuel driven internal combustion engine (actuated by gasoline, diesel or other fuels) with electric power operation for the same engine. The benefits of this integrated design may include better fuel economy, such as for hybrid vehicle applications, which may be achieved in a less complex arrangement of components, along with weight reduction accomplished by, among other things, having fewer needed components than has been achieved with related art hybrid vehicle technology, as well as the capability of varying the proportion of drive power obtained from burning fuel versus electricity.

2. Background of the Technology

To assist in understanding operation of aspects of the present invention, a conventional car's engine operation will now be briefly described. A conventional gasoline or diesel internal combustion engine of the most common type employs a given number of cylinder chambers, typically from 4 to 8. For example, an inline cylinder engine is common for 4 cylinder designs, a V6 structure or inline 6 arrangement for 6 cylinder designs, a V8 arrangement for 8 cylinder designs, and a flat (or so-called boxer) engine for some less common designs. During operation, each cylinder is sequentially charged with gasoline, diesel, or other combustible fuel, along with air, which is compressed and then combusted (in conjunction with generation of a spark by a spark plug for some fuel types) producing an in-cylinder explosion that produces motion of the enclosed piston, in turn rotating the engine's crankshaft to produce rotary motion in the drive train (or driveline). The output motion of the crankshaft travels through the drive train and typically is transmitted to gear arrangement(s) to propel the vehicle, for example. The exhausted gas mixture in the cylinder is then removed in an exhaust cycle for each cylinder.

Combustion engines are normally designed to operate in either two or four stroke combustion cycles. For the four stroke version, which is the more common variation for most conventional vehicles, an intake stroke, a compression stroke, a combustion stroke, and an exhaust stroke are used. The strokes typically occur in conjunction with operation of a camshaft that controls the timing cycles of particular cylinder valves, certain of which open to control the entry of fuel, close (e.g., during combustion), and certain of which open to exhaust expended gases.

There is a further unmet need in the related art to provide methods, systems, and devices that combine the power and conventional benefits of existing combustion engines with the efficiency and pollution reduction, among other features, of electric power.

SUMMARY OF THE INVENTION

Aspects of the present invention provide for integrating both fuel-burning combustion and electro-motive force into a single engine structure with, but not limited to, one or more of the following features:

1) significant weight reduction made possible by the elimination of a starting motor and the electric drive motors used in other existing designs of hybrid vehicles;

2) elimination of the complex gear box, or reduction in complexity thereof, that is necessary in many current alternative designs, to blend power from the internal combustion engine and the needed external electric motors which combine to propel the vehicle;

3) providing a flexible range of combinations of power derived from fuel combustion and the (not combustion driven) electric motor aspects of the piston/cylinder engines or the rotary cells in a Wankel engine arranged as needed to provide the drive power and fuel saving economy as is possible in this design;

4) since this invention provides for continuous engine rotation, employment of normal usage of fan belt driven accessories is possible; thus, fan belt rotationally-driven devices, such as the cooling fan, power steering, and air conditioning units may all be of the conventional type; in contrast, in conventional hybrid vehicles, where the combustion engine is stopped at times, it is common to provide separate electrically powered versions of these needed devices, which typically may be more costly, heavier, and more prone to failure.

Exemplary variations of the present invention will now be described.

Piston/Cylinder Engine Variation

Aspects of an exemplary variation of the present invention involve the addition and integration of appropriate electrical components as needed to also make the components of a typical combustion engine contemporaneously or alternatively able to operate as an electrically driven motor, thus improving fuel efficiency, among obtaining other advantages. The electrical components of some variations of this exemplary implementation of aspects of the present invention may include an embedded electrical coil in or near the wall or cylinder sleeve of each cylinder and/or a magnetic field-producing core located within each piston itself.

In operation, the electrical energy from a battery or other source of electrical energy flows to the cylinder coils, each of which is strobed with electrical energy during, for example, the stroke that corresponds to a combustion stroke in a four cycle engine. In some variations, a master computer module or other controller controls the combustion of the gasoline, diesel or other fuel with the air mixture in each cylinder, for example, as well as the timing of the electrical pulse transmitted to the cylinder's electrical coil. These coil energized functions produce motion of the cylinder in a manner similar to solenoid operation. This operation is also interchangeably referred to herein as a "bidirectional linear actuator." Each piston/cylinder pair, whether running in internal combustion or electrical mode, or a combination thereof, may be controlled by timing determined, for example, by the computer driven master controller.

The ratio of propulsion energy derived from combustion versus electrical operation may be determined and controlled by the master controller, for example, based on vehicle driving circumstances or other operational input that is received or determined; optimal operation may, for example, be predicated on obtaining the best fuel economy or most power possible for a given driving condition.

Excess kinetic energy from the motion of the vehicle may similarly be recaptured via generation of electrical energy through the rotation of the wheels or motion of the pistons, the recapture from the rotation of the drive wheels occurring via the backward utilization of the differential and transmission pathway via the driveline, so as to cause the electrical components to operate as a driven onboard generator, the output of which may be used, for example, to slow the vehicle and/or to replenish battery charge in the supply battery. Thus, a conventional electrical generator module may be placed along the drive train to capture kinetic energy and feed direct current (DC) recharging into the drive battery whenever the vehicle is slowing, for example.

Another optional feature, in accordance with this exemplary implementation, that may improve overall economy of fuel usage and/or operation, involves introduction of a turbine or otherwise driven electric generator, with or without an engine air intake compressor, in place of or in combination with the standard onboard kinetic-energy-driven generator (e.g., belt-driven generator or alternator, as mentioned above). This generator may be driven, for example, by hot gases fed back from the vehicle's exhaust system (e.g., when arranged and operated similarly to a conventional turbocharger) and thus may not significantly impact, in a negative way, the efficiency of the vehicle's fuel consumption. This feature, in effect, may thereby provide somewhat of a 'free' source of battery recharging electricity and may also provide a good deal of saved weight if the kinetic energy version of a generator or alternator is not used with it.

Rotary or Wankel Engine Variation

Another exemplary implementation in accordance with aspects of the present invention involves the integration of both a fuel fired internal combustion rotary engine (e.g., Wankel) and an integrated electric motor. The benefits of this integrated design include, among other things, better fuel economy for a hybrid vehicle, which may be achieved via a simpler arrangement of other needed components than in related art hybrid drives, along with weight reduction accomplished by having fewer needed components, for example, than related art hybrid devices.

To assist in understanding operation of aspects of the present invention, an exemplary Wankel car's engine operation will now be briefly described. An exemplary Wankel engine includes an engine rotor housing with internal chamber of elliptical or partially elliptical shape, within which rotates a rotor shaped somewhat in triangular cross-sectional form, with wiping seals located at the three apexes, which remain in contact with the inner walls of the rotor housing during operation. This structure is also interchangeably referred to herein as a "rotary cell." The rotor housing contains one or more intake ports for the fuel/air mixture to enter, and one or more exhaust ports for burned gases to be expelled. For each rotor revolution of 360 degrees, each one of the three cavities formed by each side of the triangular rotor with the housing will (1) intake fuel/air mixture, (2) compress the fuel/air mixture, (3) combust the fuel/air mixture by the firing of one or more spark plugs that the cavity resides over at cyclic compression, and (4) force the exhaust of the spent gases.

The gas mixture combusted by the spark plugs produces a rotary cell explosion that causes the enclosed rotor to spin, thus causing the engine's crankshaft, which is embedded within or coupled to each rotor of each rotor cell, to turn with a force that is multiplied by the number of rotor cells (comprising the engine), and by a gearing arrangement, which in turn may propel a vehicle, for example.

Variations of this exemplary implementation in accordance with aspects of the present invention may involve the addition and integration of appropriate electrical components as needed to also make the components of a typical Wankel combustion engine concurrently or alternatively able to operate as an electrically driven motor, thus improving fuel efficiency, among obtaining other advantages. The inclusion of the electrical components may involve, for example, imbedding an electrical coil winding into the walls of the rotor housings and constructing an electric motor armature into the rotor itself for supplementing the motor's fuel burning cells, and/or replacing the combustion rotor with an electric motor armature in one or more cells, such that each such cell comprises an electric motor unit designed to fit the physical characteristics of the engine, but not including the fuel burning capability of combustion cells.

These electric motor cells or features are each integrated with the crankshaft/drive-gearing in a similar way as the rotary fuel cells. The electrical energy from an onboard battery, for example, flows to the housing and rotor so as to produce electric motor operation. This electric motor could be selected, as appropriate, to be a conventional direct current (DC) or Alternating Current (AC) design, with consideration of the most appropriate torque characteristics needed for a motor vehicle. A master computer module or other control feature may control the relationship of the fuel injected into the rotor cell and the electrical operation of the integrated component(s)/cell(s). The ratio of propulsion energy derived from burned fuel/gases versus electrical motor power may be evaluated and controlled by the master computer, based on the inherent driving situation at that time, and operation may be predicated on obtaining the best fuel economy possible or optimal power needed, for example. The electrical energy dedicated to the electric motor component(s) of this engine would be designed to interact, in any proportion, with the fuel burning rotor cell(s), or it could be exclusively dedicated to an integrated electric motor cell(s) which operates only on electric power, for example.

The electric motor cell(s) may be attached to or otherwise integrated with the overall engine framework in such a way that its rotor(s) rotates in synchronism with other rotor cell(s) in the engine. Excess kinetic energy from the motion of the vehicle may be recaptured by various features or methods, similarly to those as described above, via an onboard generator/alternator, for example. Such recaptured energy may be used, for example, to replenish battery charge in the propulsion motor supply battery (and incidentally, also the starter battery).

Variation for Integration of an Electric Motor Directly onto the Crankshaft for Hybrid Vehicle An alternate method and system for introducing electric drive power into the propulsive force of a hybrid vehicle that may achieve similar benefits to those of other variations in accordance with aspects of the present invention (e.g., similar to those indicated above) includes incorporating a complete electric motor structure so that the armature (rotating element) is entirely integrated onto the crankshaft of the combustion engine machinery, and the stator (the fixed motor element) and its housing surround this armature, while all these components remain contained within the body of the engine block. Various operational actions, variable combustion versus electric power and control may be similar to as described in the variations described above.

Additional advantages and novel features relating to variations of the present invention will be set forth in part in the description that follows, and in part will become more apparent to those skilled in the art upon examination of the following or upon learning by practice of aspects thereof.

BRIEF DESCRIPTION OF THE FIGURES

Aspects of the present invention will become fully understood from the detailed description given herein below and the accompanying drawings, which are given by way of illustration and example only and thus not limitative of the present invention, and wherein.

DETAILED DESCRIPTION

Details for various exemplary implementations in accordance with aspects of the present invention will now be described.

Piston/Cylinder Engine Variation

In some variations of the present invention, design and fabrication of the engine's cylinder walls and the enclosed piston may be important to fuel economy. In these variations, the cylinder wall sleeve may contain a wire wound electrical coil, for example, of suitable capacity, imbedded and oriented such that, when an appropriate level of electrical current (e.g., direct current or DC) flows through the coil, an electromagnetic field is created in the travel path of the cylinder, of sufficient strength to cause motion with appropriate force of the magnetic element (e.g., emplaced slug) comprising or contained in the piston body, thus producing motion similar to that occurring with a conventional solenoid (also known as a "bidirectional linear actuator" for this application). This action may be sufficient in strength to move the piston assembly downward in its combustion stroke, even when no internal combustion operation occurs, so as to replace the force that would be achieved by such internal combustion operation. This force may be attenuated via control by a master controller, for example, so that when gasoline, diesel or another fuel and electrical energy sources are operated in combination, the net output force will not exceed the operational capacity of the cylinder (e.g., exceeding internal pressure design limitations).

The use of properly rated materials may also be important, in some variations, for effective operation of the motor. Thus, for example, the cylinder wall sleeve and the piston body may need to comprise a non-ferromagnetic material, such as ceramic, plastic or non-conductive, non-shielding, and/or non-flux conducting metal, so as not to negatively interfere with the electromagnetic field created by the coil in the cylinder wall. The magnetic element in the piston body and its walls may need to be designed, in some circumstances, to withstand temperatures inherent in the engine's operation when operating in internal combustion mode.

The driveline of rotary motion provided by an engine in accordance with aspects of the present invention can be of conventional design, transmitted from the engine via a crankshaft, for example, thereby providing rotational motion via a transmission and differential, which in turn rotate the drive wheels of a vehicle.

Because some variations of engines in accordance with aspects of the present invention allow for complete operation using only the electrical features, without gasoline, diesel or other fuels supplying combustion power assistance, for example, one or more of these variations may eliminate or reduce the need for a separate starter motor. This approach can also obviate the need for electric drive motors for the drive wheels, as are typically used for some conventional hybrid vehicles, for example. However, an electric motor and/or generator may optionally be used within the driveline, so that excess kinetic energy available when the vehicle is slowing down or braking can be harnessed for regenerative battery charging, for example. Alternately or in addition to such a dynamic recharging feature, an exhaust turbine-driven or otherwise operated generator may also be used with some variations of engines in accordance with aspects of the present invention to replenish stored electrical power (e.g., to recharge batteries).

Modes of operation may vary so as to take advantage of the best combination of economical parameters at any given time for motor operation, for example. In some variations, the engine can operate totally on gasoline, diesel or other combustible fuel, for example, or totally on electrical energy, or with a mix of these two modes, at a given time. It may be beneficial to the economy of operation in some variations to have the mix of operating modes be accomplished, for instance in a 4 cylinder engine, by operating two cylinders in the gasoline, diesel or other fuel mode, while two other cylinders are operating in electrical mode, thereby achieving operation that is 50% by combustible fuel and 50% by electrical drive. Alternatively, the electrical powered operation of a cylinder may be combined with the fuel combustion mode concurrently to provide a boost of power when needed.

One feature of some variations of engines in accordance with aspects of the present invention includes a valve structure and associated camshaft(s) designed or selected such that, when a cylinder is operating only in electrical mode, the motion of the piston is not impeded by high compression load during a stroke that would occur for internal combustion operation. This operation may be accomplished in a manner similar to variable valve timing electronically controlled (VTEC) cams, which control valve operation in certain conventional engine designs, for example, by opening the valves at appropriate times to reduce combustion chamber pressure.

Another aspect of the present invention involves consideration of the type of material and component arrangement used for the pistons. In some of the above exemplary variations, the piston is described as having a magnetic element or slug, which may be located, for example, generally at or near its center. Other options are also possible to achieve the needed magnetic effect. For instance, much of or the entire piston structure may comprise a magnetized ferromagnetic or other material (e.g., magnetized ceramic material), so long as the material is able to retain its magnetic and other necessary characteristics while withstanding the stress of heat and explosive force inherent in internal combustion engine operation. An alternative variation involves use of another wire wound coil or other electromagnet element in the piston itself, so that electrical energy may be delivered to this coil or other element to variably produce a magnetic field of alternating or otherwise varying direction. In operation, this field may be oriented in alignment with or oppositely to the field produced by the winding around the cylinder wall, for example, such that the piston is driven in a direction appropriate for the cycle occurring at any point during operation. This approach may constitute an alternating current or AC mode of electrical operation of the piston/cylinder current flow being controlled by the current switch module. This approach thus provides electromagnetic solenoid-like operation.

However, one drawback of this electromagnetic approach may be that the design is necessarily more complex than permanent magnet variations, as the electromagnetic approach may require a commutator or other mechanism to connect the piston winding to the electrical source and more complex timing control by the master computer or other controller, as well as additional switch equipment. If a switching option for electric current to be fed into the cylinder wall coils is included in the design, then by switching the polarity of this coil in consonance with the sequence of the four strokes of a 4-stroke cylinder cycle, the design may produce electro-motive power to the piston, such that power phases in the cylinder occur in up-strokes of the combustion and exhaust cycle, as well as down-strokes of each cycle (or their corresponding equivalent cycles for combustion cylinders, if dedicated electrical cylinders are used), thus increasing vehicle drive power significantly.

Figure 1A:
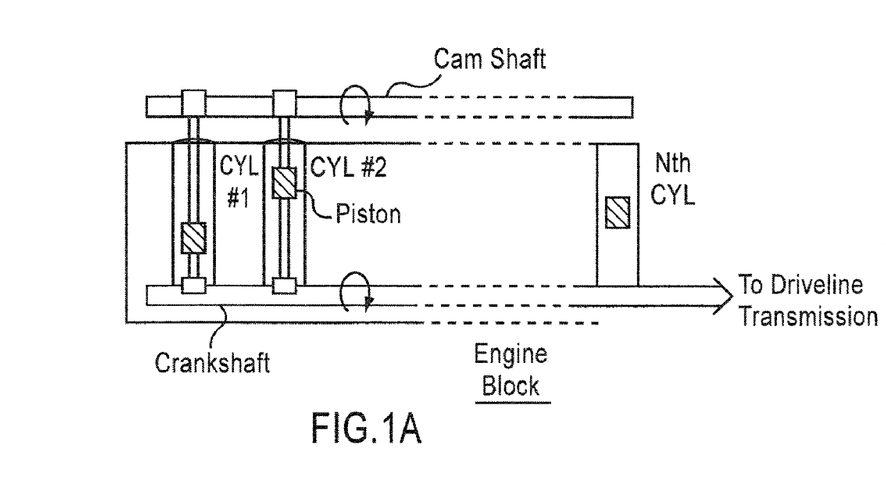
FIG. 1A shows a representative diagram of an exemplary engine block with representative pistons/cylinders contained therein, in accordance with aspects of the present invention.
Figure 1B:
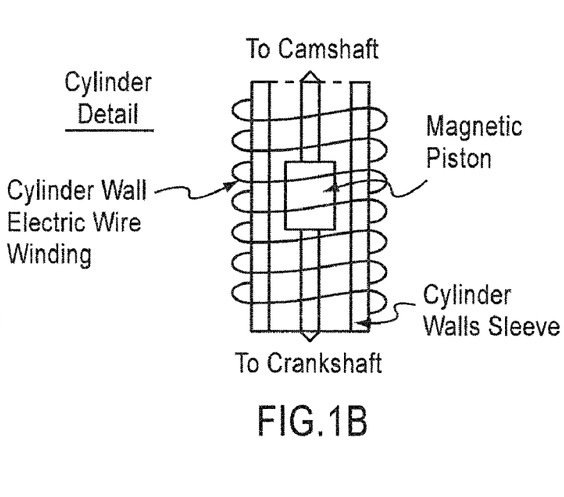
FIG. 1B contains an illustrative diagram of one exemplary cylinder with electrical coil wiring in the walls and a magnetic core piston, both shown in relation to a camshaft and crankshaft structure, in accordance with aspects of the present invention.
Figure 1C:
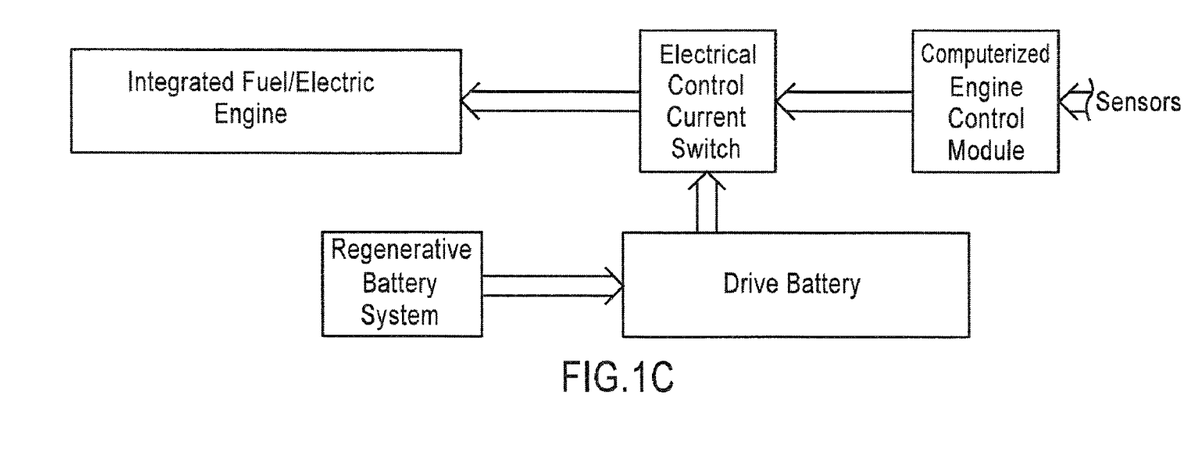
FIG. 1C presents a representative block diagram of exemplary electric power generation features usable with a combustion engine, in accordance with aspects of the present invention.

FIGS. 1A-1C illustrate various exemplary features of a representative piston based hybrid motor, in accordance with aspects of the present invention. FIG. 1A shows a representative diagram of an exemplary engine block with representative pistons/cylinders contained therein, in accordance with aspects of the present invention. FIG. 1B contains an illustrative diagram of one exemplary cylinder with electrical coil wiring in the walls and a magnetic core piston, both shown in relation to a camshaft and crankshaft structure, in accordance with aspects of the present invention. FIG. 1C presents a representative block diagram of exemplary electric power generation features usable with a combustion engine, in accordance with aspects of the present invention.

Exemplary Implementation for Increased Efficiency in Fuel Use and Ease of Development One exemplary implementation that makes use of an existing engine block, and one that may be particularly fuel efficient, is implemented using a standard four cylinder inline engine (a choice made for fuel efficiency, but not limited thereto, so that larger engines, such as 6 or 8 cylinder versions might also be so improved by this approach). This engine, upon implementation, has two of its cylinders modified so that they are not capable of fuel burning, that is, having a lack of valves and camshaft mechanisms, and any other components needed solely for the burning of fuel and the removal of waste products. The two non-fuel burning cylinders are fitted with the electrical components described herein, which are needed to conform to the electrical motor operation, so that the engine would operate with two fuel-burning cylinders and two electromotive-only powered cylinders. The two electromotive powered cylinders, not having any valve structure would have escape ports for the release of trapped air or any gas, so that the cylinder would be free to move up and down without restriction, which would otherwise occur due to compression of any fluid (e.g., gas) contained therein.

This engine version would then operate with its four cylinders supplying motive power, two from fuel usage and two powered electrically from the hybrid battery. Control of operation is accomplished by a master control module (e.g., computer or other processing device). In order to minimize engine vibrations, it is assumed that each cylinder would provide about equal power levels to, that is, approximately one quarter of the total power demand for, that needed for a particular driving situation, as well as each cylinder having approximately the same weight as each other. Thus, engine vibration would be no different than that the original four cylinder fuel-fed engine produced.

As lower demands for power-propulsion-situations take place, the master control module would reduce the power provided by each cylinder in approximately equal amounts. This design version makes original implementation easier to accomplish, for example, because work begins with an already available engine design and one that already presumably constitutes an efficient choice for high fuel efficiency (e.g., four cylinder engine presumed more efficient).

Exemplary Implementation of Rotary or Wankel Engine Variation

In accordance with aspects of the present invention, the design and fabrication of the engine's rotor housing and rotor mechanism for a Wankel-based implementation may be critical to the design of the combined power plant and may, for example, affect fuel economy. In one variation, the rotor housing wall contains a wire wound electrical coil, for example, of suitable capacity, imbedded therewithin, such that, when an appropriate level of electrical current (DC or AC) flows through the coil, an electromagnetic field is created around the rotor in sufficient strength to activate, with appropriate force, the rotor-contained electro-motive magnetic armature, which may contain one or more permanent magnets or, for example, a magnetic coil winding and, depending on choice of design, brushes and commutator. This electrical current flow in the rotor housing coil must be sufficient in strength to provide needed electrical motor power to the fuel burning rotor cell(s) or to the electric motor cell, in order to provide total motive force needed to turn the engine at the speed desired. This force may be attenuated under control of the master computer or other controller, for example, so that when both fuel and electrical energy sources are combined in a rotor cell and electric motor cell, the net output force will not exceed designed strength limits. The commands of the controller may control electrical current flow, using, for example, a solid state electronic switching device, which provides DC current, or if so designed, AC current for an AC motor requirement.

In some variations, use of properly rated materials may be important to effective operation. Thus the materials of the rotor housing and the rotor itself may be selected and designed so as not interfere with the electromagnetic fields created by the coils in the rotor housing and rotor (armature), for example. And the magnetic coils may be selected or designed to withstand the temperatures inherent in the engine's operation when fuel is combusted. Removal of heat from the engine cells and the controller and current switches, for example, may be required.

The driveline of rotary motion provided in accordance with aspects of the proposed vehicle structure can be of conventional design, with drive power exiting the engine via the crankshaft and driveline components, for example to provide rotational motion through the transmission and then into the differential gear box, which in turn rotates the drive wheels as is typical to vehicles using conventional Wankel engines.

Figure 2A:
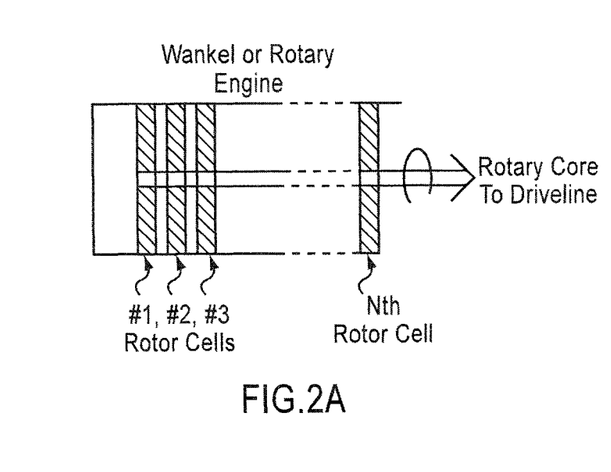
FIG. 2A shows a representative diagram of an exemplary Wankel type engine structure showing several included rotary cells with output via a driveline, for use in accordance with aspects of the present invention.
Figure 2B:
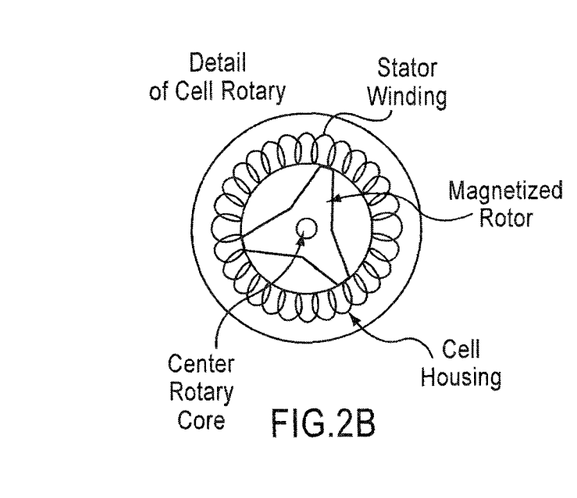
FIG. 2B is an illustrative example of one such rotary cell with electrical coil wiring imbedded within its shell or housing to implement a motor stator and a combustion-capable rotor also acting as a magnetic armature for its motor function, in accordance with aspects of the present invention.
Figure 2C:
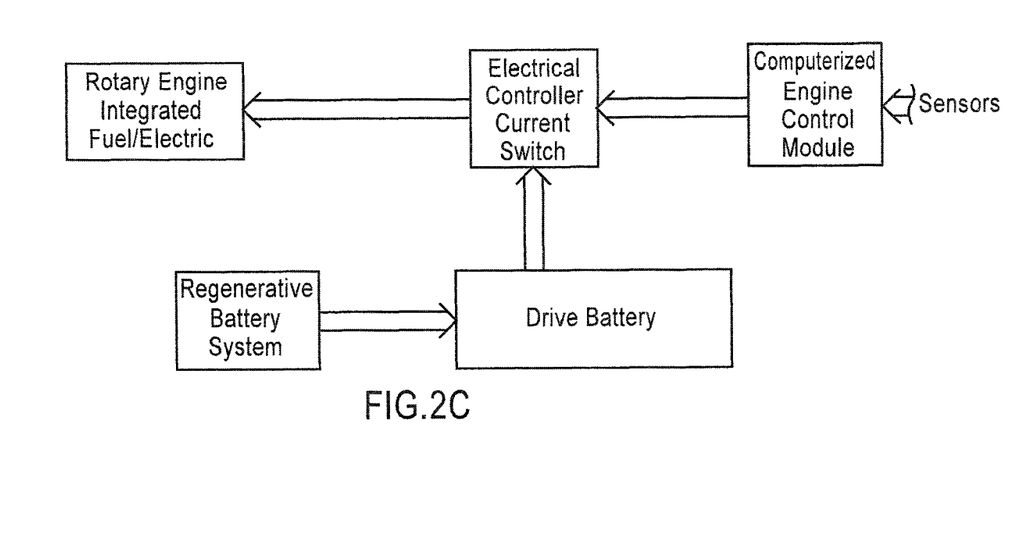
FIG. 2C presents a representative block diagram of exemplary electric power generation features usable with a combustion engine, in accordance with aspects of the present invention.
Figure 2D:
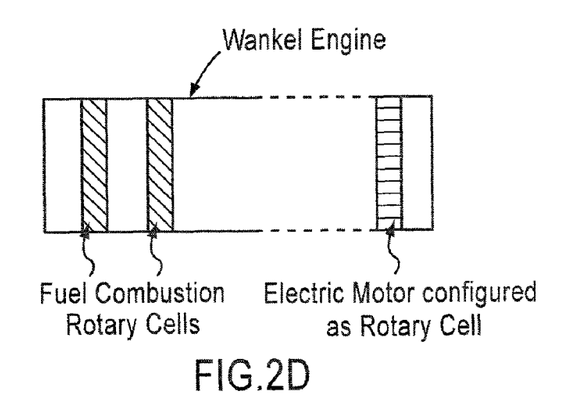
FIG. 2D shows a representative diagram of an exemplary integrated Wankel or rotary engine with a single electrically driven motor cell for use, for example, in a vehicle, in accordance with aspects of the present invention.

FIGS. 2A-2D illustrate various exemplary features of a Wankel type hybrid motor, in accordance with aspects of the present invention. FIG. 2A shows a representative diagram of an exemplary Wankel type engine structure showing several included rotary cells with output via a driveline, for use in accordance with aspects of the present invention. FIG. 2B is an illustrative example of one such rotary cell with electrical coil wiring imbedded within its shell or housing to implement a motor stator and a combustion-capable rotor also acting as a magnetic armature for its motor function, in accordance with aspects of the present invention. FIG. 2C presents a representative block diagram of exemplary electric power generation features usable with a combustion engine, in accordance with aspects of the present invention. FIG. 2D shows a representative diagram of an exemplary integrated Wankel or rotary engine with a single electrically driven motor cell for use, for example, in a vehicle, in accordance with aspects of the present invention.

Variation for Integration of an Electric Motor Directly onto the Crankshaft for Hybrid Vehicle An alternate method and system for introducing electric drive power into the propulsive force of a hybrid vehicle that may achieve similar benefits to those of other variations in accordance with aspects of the present invention (e.g., similar to those indicated above) includes incorporating a complete electric motor structure so that the armature (rotating element) is entirely integrated onto the crankshaft of the combustion engine machinery, and the stator (the fixed motor element) and its housing surround this armature, while all these components remain contained within the body of the engine block. Various operational actions, variable combustion versus electric power and control may be similar to as described in the variations described above.

Figure 3:
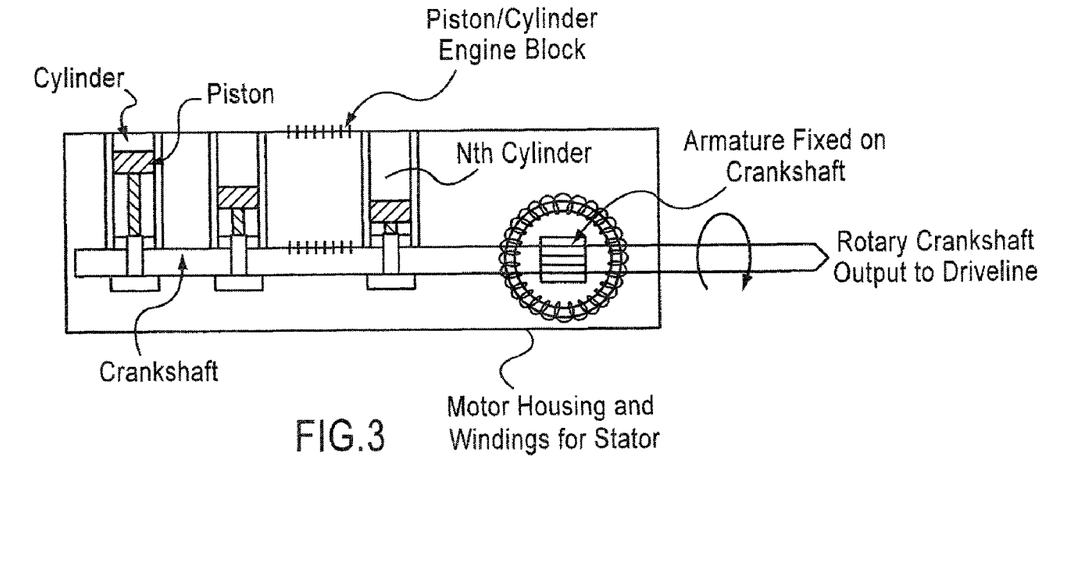
FIG. 3 is a representative diagram of exemplary features of an added electric motor component attached to an engine crankshaft within an engine block, in accordance with aspects of the present invention.

FIG. 3 is a representative diagram of exemplary features of an added electric motor component attached to an engine crankshaft within an engine block, in accordance with aspects of the present invention Other Exemplary Features Because this engine design of the vehicle provides for complete operation based on its electrical characteristics, without the combustion of fuel, no starter motor may be necessary to start the engine, either at the turn-on of ignition or during the intermittent fuel burns needed to produce hybrid operation. Thus, some variations of this exemplary implementation may provide total removal of the weight of the starter motor, as well obviate the need for electric motors powering the drive wheels.

However, in other variations, an electrical generator may be provided within the driveline, for example, so that excess kinetic energy available when the vehicle is slowing down or braking, or when battery replenishment is needed during steady highway speeds, for example, may be recaptured or harnessed via the generator—e.g., producing DC current, which is fed back to the drive system battery for recharging.

An alternate variation improves performance (e.g., economy) by additionally introducing a turbine driven electric generator, with or without an engine air intake compressor and in place of or in combination with the standard onboard kinetic-energy-driven generator as further described herein. This turbine may be driven by the flow of hot gases fed from the vehicle's exhaust system, for example, and thus would not substantially impact, in a negative way, the efficiency of the engine's fuel consumption. This feature thereby provides a 'free' source of battery recharging electric current and may provide a good deal of saved weight if the kinetic energy version of a generator is not used.

Figure 4:
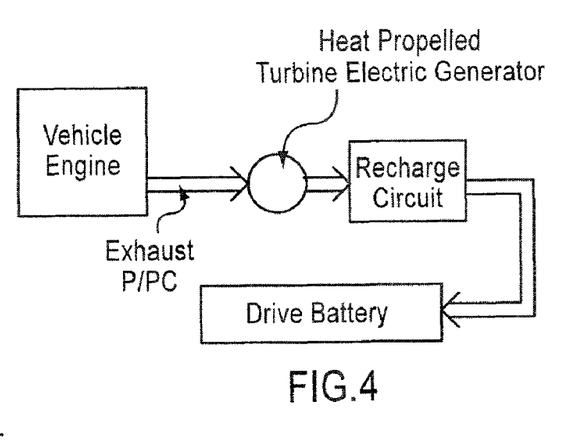
FIG. 4 contains in a representative block diagram of an exemplary electric generator turbine attached to a vehicle exhaust system to provide, for example, recharging electric energy for the vehicle's drive battery, in accordance with aspects of the present invention.

FIG. 4 contains in a representative block diagram of an exemplary electric generator turbine attached to a vehicle exhaust system to provide, for example, recharging electric energy for the vehicle's drive battery, in accordance with aspects of the present invention.

Modes of providing sources of power (electric or combustion driven) may vary with economy needs or other parameters at any given time in the engine's operation. The engine can operate totally on combusted fuel, totally on electrical energy, or with a mix of these two modes at a given time. The choice of operating parameters at any moment may be calculated and implemented by the controller, for example.

Depending upon the choice of electric motor construction configured into the fuel burning rotor cells, for example, it may be necessary for the rotor (armature) coil to receive its electrical current from the drive battery via brushes and a commutator (or other similarly operating features), and these components may need to comprise materials that withstand the explosive force and heat of the combustion process within their rotor housings. The timing and current switching that are essential to cause the motor action to occur may be controlled by the controller (e.g., programs running in the master computer).

Exemplary Engine Controller/Computer Features

Figure 5:
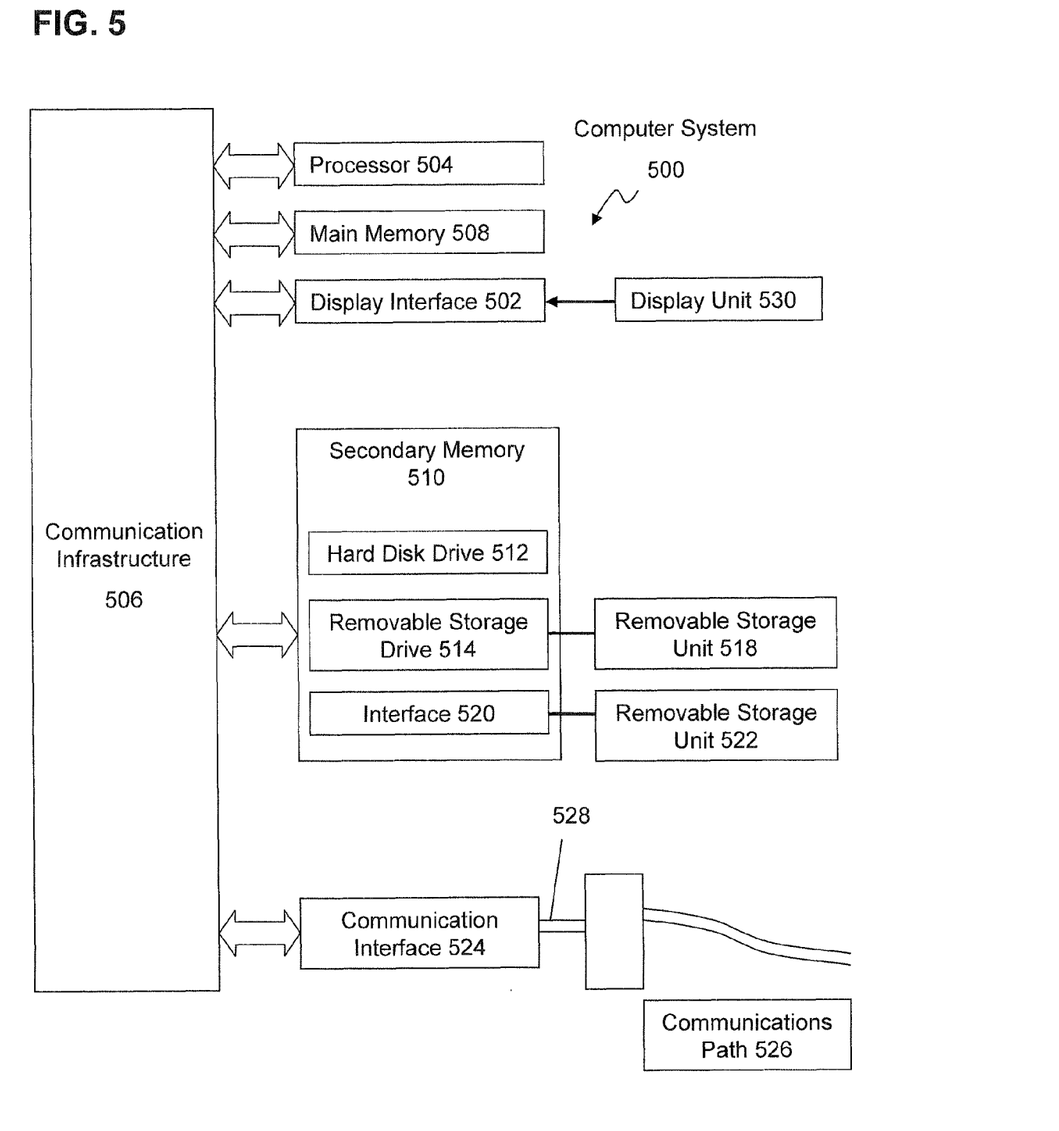
FIG. 5 illustrates various computer hardware and software elements, or combination thereof, with or upon which aspects of the present invention may be implemented, such as within an engine controller.

Aspects of the present invention (e.g., engine controller) may be implemented using hardware, software or a combination thereof and may be implemented in one or more computer systems or other processing systems. In one variation, aspects of the present invention are directed toward one or more computer systems capable of carrying out the functionality described herein. An example of such a computer system 200 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this exemplary computer system. After reading this description, it will become apparent to a person skilled in the relevant art(s) how to implement aspects of the present invention using other computer systems and/or architectures.

Computer system 500 can include a display interface 502 that forwards graphics, text, and other data from the communication infrastructure 506 (or from a frame buffer not shown) for display on the display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative variations, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 may be in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects of the present invention are directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features in accordance with aspects of the present invention, as discussed herein. In particular, the computer programs, when executed, enable the processor 504 to perform the features of certain aspects of the present invention. Accordingly, such computer programs represent controllers of the computer system 500.

In one variation where aspects of the present invention are implemented using software, the software may be stored in a computer program product and loaded into computer system 500 using removable storage drive 514, hard drive 512, or communications interface 524. The control logic (software), when executed by the processor 504, causes the processor 504 to perform the functions in accordance with aspects of the present invention, as described herein. In another variation, aspects of the present invention are implemented primarily in hardware using, for example, hardware components, such as application specific integrated circuits (ASICs). Implementation of the hardware state machine so as to perform the functions described herein will be apparent to persons skilled in the relevant art(s).

Exemplary Advantages Achieved by Various Implementations of Aspects of the Present Invention Aspects of the present invention may provide one or more of the following features:

- A device and method for integrating both fuel-burning combustion and electro-motive force into a single engine structure;
- Significant weight reduction over related art, made possible by the optional elimination of a starting motor and/or other electric motors/generators/alternators typically used with conventional hybrid designs; also eliminated or partially eliminated may be the complex gear box typically necessary for blending power from the internal combustion engine for conventional hybrid designs, along with the electric drive motor(s) that in combination propel the vehicle;
- Electricity for recharging the drive battery may be provided by regenerative operation of the electrical portion, a turbine-driven generator powered by exhaust gases, thus possibly eliminating the drive-line generator and reducing vehicle weight, while not adding significant drag force to the driveline, or by other alternator/generator;
- Increased power efficiencies may be achieved by the application of engine power in all cylinder stroke modes, whether in combustion or exhaust cycles and regardless of whether the pistons are moving in up-stroke or down-stroke motion;
- A flexible range of combinations of power derived from fuel burning and/or electro-mechanical power generation may be achieved;
- Since various features provide for continuous engine rotation consistent with conventional combustion engines, normal usage of fan belt driven accessories may be employed; thus, fan belt rotationally-driven devices, such as the cooling fan, power steering and air conditioning units may all be of the conventional type; in conventional hybrid vehicles, where the combustion engine is stopped at times, it is common to provide separate electrically powered versions of these needed devices may be costly, weight impacting, and prone to failure;
- In some variations of the present invention, the use of some dedicated fuel-burning cylinders and some dedicated electromotive-powered cylinders may be particularly well suited for an inline 4 cylinder engine blocks, thereby making initial design and follow-on production more easily accomplished; and
- In some variations of the present invention involving Wankel engine operation, a fully functioning electric motor may be included as part of or a fully discrete cell within the engine to maximize performance or other selected operational characteristics.

Aspects of the present invention being thus described in terms of several variations and illustrative examples, it will be obvious that the same may be varied in many ways. Such variations are not to be regarded as a departure from the spirit and scope of the described aspects, and to incorporate such modifications as would be obvious to one skilled in the art.

Additional advantages and novel features relating to the present invention will become more apparent to those skilled in the art upon examination of the descriptions above or upon learning by practice of aspects of the invention.

The invention claimed is:

1. A reciprocal combustion engine, comprising:
   at least one first cylindrically shaped piston, the at least one first cylindrically shaped piston having a magnetic field producing component contained therein;
   at least one second cylindrically shaped piston;
   a combustion engine block having cylindrical openings for receiving the at least one first cylindrically shaped piston and the at least one second cylindrically shaped piston; and
   a magnetic field inducing component contained within the engine block for inducing an electric field in proximity to the at least one first cylindrically shaped piston and the at least one second cylindrically shaped piston,
   wherein the at least one first cylindrically shaped piston is configured to operate in a fuel mode and the at least one second cylindrically shaped piston is configured to simultaneously operate in an electrical mode.

2. The engine of claim 1, wherein the at least one first cylindrically shaped piston is reciprocally moveable within the cylindrical opening via combustion of fuel within the cylindrical opening.

3. The engine of claim 1, wherein the at least one second cylindrically shaped piston is reciprocally movable via induction of the electric field in proximity to the cylindrically shaped piston.

4. The engine of claim 1, wherein magnetic field producing component comprises a permanent magnet or an electromagnet.

5. The engine of claim 1, wherein the magnetic field component comprises a coil.

6. The engine of claim 3, wherein the electric field is selectively induced via a control module.

7. The engine of claim 6, wherein the control module comprises a processing system.

8. A reciprocal combustion engine, comprising:
   a first cylindrically shaped piston, the cylindrically shaped piston having a magnetic field producing component contained therein and moving in response to electrical energy within a first cylindrical opening;
   a combustion engine block having the first cylindrical opening and a second cylindrical openings, the first cylindrical opening receiving the first cylindrically shaped piston;
   a magnetic field inducing component contained within the engine block for inducing an electric field in proximity to the first cylindrically shaped piston; and
   a second cylindrically shaped piston received within the second cylindrical opening, the second cylindrically shaped piston moving in response to fuel combustion within the second cylindrical opening.

* * * * *